Jan. 18, 1938.　　　S. F. D. PETERSEN　　　2,105,986
THRESHER SCREEN
Filed July 7, 1936　　　2 Sheets-Sheet 1

Inventor
Soren F. D. Petersen.

By Clarence A. O'Brien
Hyman Berman
Attorneys

Jan. 18, 1938. S. F. D. PETERSEN 2,105,986
THRESHER SCREEN
Filed July 7, 1936 2 Sheets-Sheet 2
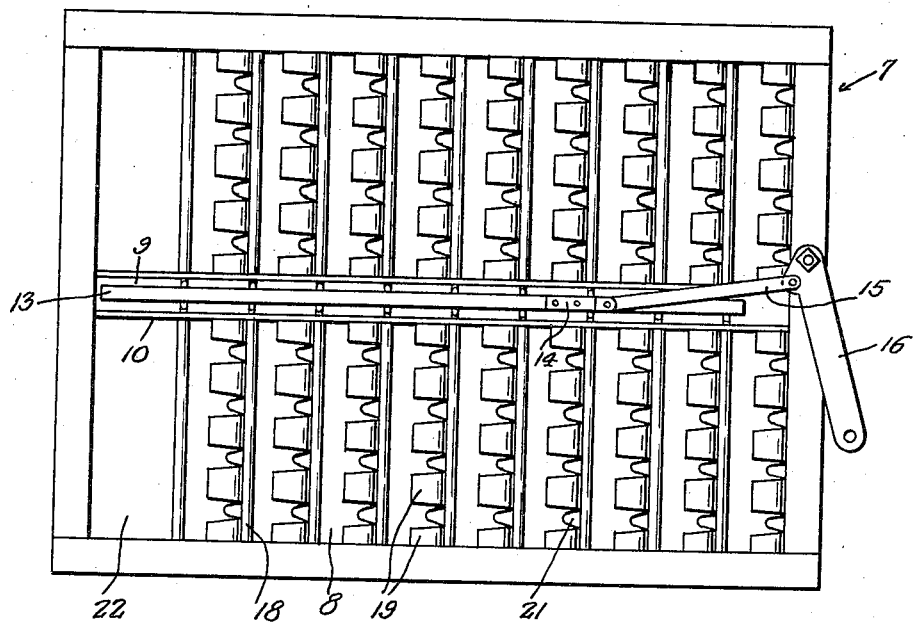
Fig. 2.
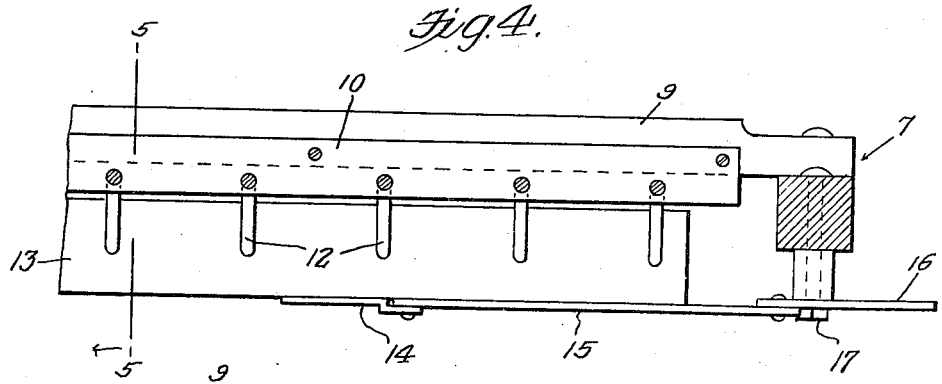
Fig. 4.
Fig. 5.
Inventor
Soren F. D. Petersen,
By Clarence A. O'Brien
Hyman Berman
Attorneys Patented Jan. 18, 1938

2,105,986

UNITED STATES PATENT OFFICE 2,105,986

THRESHER SCREEN

Soren F. D. Petersen, Webster City, Iowa

Application July 7, 1936, Serial No. 89,403

1 Claim. (Cl. 209—394)

This invention relates to sieves and screens such as are incorporated in present day threshing machines, and has reference to certain easily discernible and appreciated refinements and improvements found in what I call an adjustable or variable screen.

Persons familiar with grain threshing machines are aware, no doubt, that many of the approved types include the now well known multiple slat screen, the screen or sieve as a unit being of the vibratory type and the grain being fed therethrough by a blast of air passing over the screen.

In the screen constructions now employed in this line of endeavor substantially rectangular slats are attached to crank-controlled rocker shafts. The slots are attached along one longitudinal edge to the rocker shafts and the openings between the free swingable end and alternating pivoted end are in effect slots which are commensurate in length with the slats themselves. The variation in the width of the slot is determined by the tilt of these blade-like pivoted slats. The result is that straw and rubbish pass through the slots or openings and must thereafter be separated from the grain.

With the foregoing objections in mind, I have evolved and perfected novel slats and a special arrangement thereof such as serves to provide a unique type screen which is designed to thresh the grain clean while keeping out rubbish and straw, the same being especially useful for threshing soy beans and similar grains and otherwise serving to assist the grain in its forward movement across the sieve under the propelling action of the air blast.

Stated along more specific structural lines, the improved screen is characterized by pivotally mounted slats having spaced notches along their free swingable ends and depending guard fingers cooperating in defining the variable openings whose length and breadth may be progressively regulated according to the tilt of the slats to govern the size of the openings in relation to the type of grain which is being threshed at the time.

Other features and advantages will become more readily apparent from the following description and drawings.

In the drawings:

Figure 2 is a bottom plan view of Figure 1, showing the slat actuating or operating mechanism.

Figure 4 is a similar fragmentary sectional and elevational view taken on the plane of the line 4—4 of Figure 1.

Figure 5 is a transverse or vertical sectional view on the line 5—5 of Figure 4.

Figure 1:
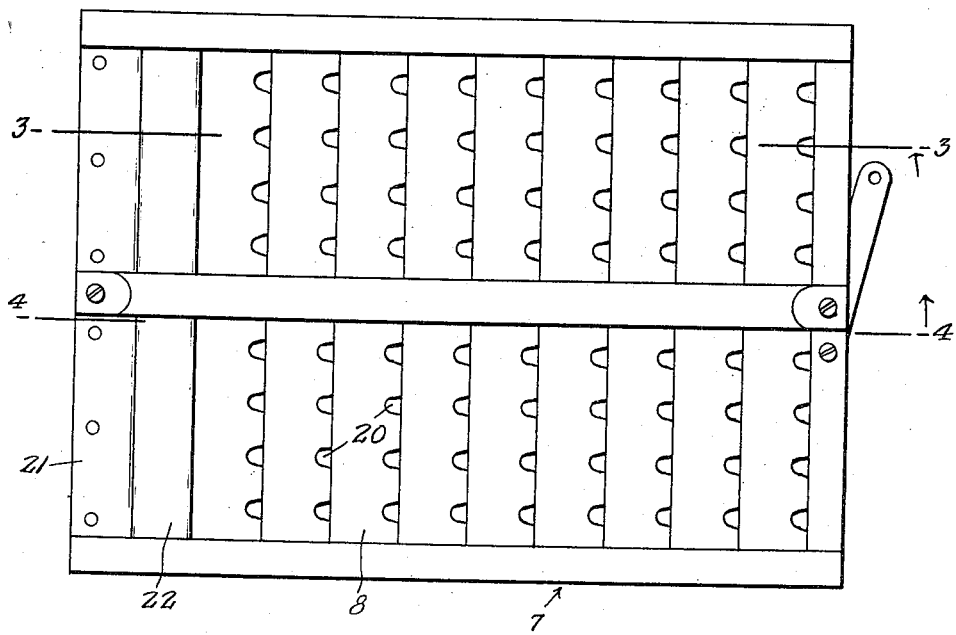
Figure 1 is a top plan view of a grain threshing screen or sieve, as a complete operative unit, constructed in accordance with the principles of the present invention.

By way of introduction to the detailed description, it is to be pointed out that so far as the frame, crank shaft and operating mechanism are concerned, these are all substantially conventional details. As a matter of fact, what I have invented is a new type slat, which, when incorporated in the frame, provides a new type screen. The slats are interchangeable and therefore susceptible of being incorporated in the conventional or regulation frame structure now employed in well known types of grain pressing machines. Notwithstanding this, it is advisable to show and describe the complete operative screen or sieve. It follows, therefore, that the numeral 7 in the drawings designates a rectangular frame which is constructed in two sections to take care of the respective sets of slats 8. As shown in Figure 4, there is a central horizontal parting strip 9 across the top of the frame having hanger pleats or plates 10 to support the oscillatory rocker shafts 11. The shafts are disposed in transversely arranged spaced parallel order and are provided with cranks 12. The cranks are operated in unison through the instrumentality of a connecting bar 13. This is provided with suitable attaching brackets 14 with which a push-pull link 15 is pivotally connected. The link in turn is attached at its outer end to an operating lever 16 pivotally supported for operation as at 17 on the bottom of the frame. Suitable remote control or other means is connected with the lever for rocking it to adjust the tilt of the slats. Ordinarily the slats are of rectangular configuration and attached along one longitudinal edge to the rocker shafts (the old slats not being shown here).

Figure 3:
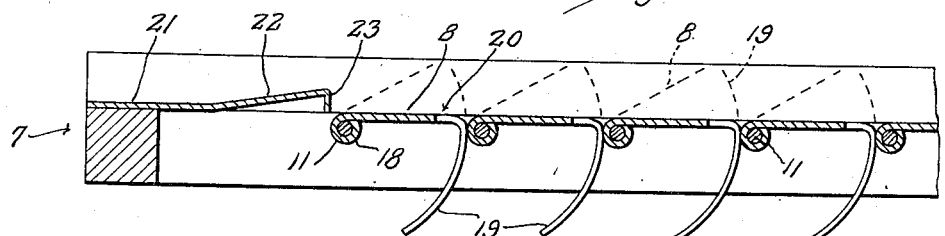
Figure 3 is an enlarged fragmentary or longitudinal sectional view taken approximately on the plane of the line 3—3 of Figure 1.
Figure 6:
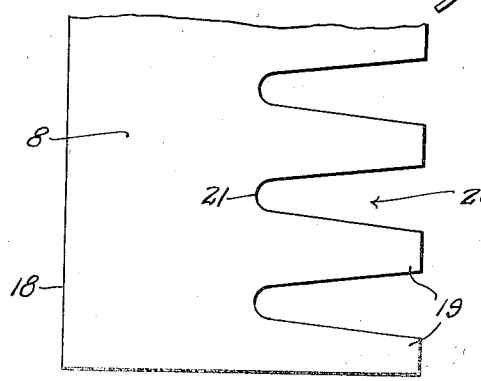
Figure 6 is a fragmentary plan view of one end portion of one of the sheet metal slats before it is bent into shape.

The improved slats are denoted by the numerals 8 and are of sheet metal construction. Each slat is in the form of a rectangular plate, the major or body portion of which is imperforate. The left hand longitudinal edge 18 is rolled upon itself as shown in Figure 3 to operatively connect it with the rocker shafts. The opposite edge is serrated to define a plurality of bendable guard fingers 19 and intervening V-shaped slots 20. The crotch portions of the slots indicated at 21 are in effect notches provided in the free swingable edge of the slats as shown in Figure 1, in which figure the slats are disclosed in closed position. The guard fingers are bent down in substantial right angles and longitudinally curved. The curvature is coincident with the arcuate path through which the free swingable ends swing, as shown in dotted lines in Figure 3.

As before stated, the slats are standardized and interchangeable and so made as to be incorporated in a regulation frame and rocker shaft structure such as is now used on so-called conventional threshing machines. Ordinarily, the regulation slats would correspond somewhat to the configuration seen in Figure 1, except that there would be no notches 21 in the free swingable edges thereof. In this arrangement the addition of the notches in this edge is one feature and these notches are in effect apertures allowing small size grain to pass down therethrough when the slats are closed, that is, down flat in the same plane as illustrated in Figure 3. It is obvious that by tilting the slats gradually to open or raised position, the slots 20 form continuations of the notches 21 so progressively or gradually increase the area of the openings in a longitudinal as well as a transverse dimension. That is to say, the length and breadth of the opening are variable conditional upon the tilt of the slats above the normal horizontal plane or position. This makes it possible to definitely regulate the size of the openings according to the size of the grain designed to pass therethrough.

Considering the invention from another angle, one might consider the guard fingers as defining L-shaped notches beginning at the crotch 21 and extending to and beyond the free ends of the guard fingers 19. These notches would be of L-shaped form with the short portion thereof flush with the closed slats as shown in Figure 3 and the extended or long portions thereof angularly disposed to the imperforate body portions of said slats. Thus we have slats with L-shaped notches in the free swingable ends thereof, the length of the notches being increased or decreased depending on the pivotal or tilted movement of said slats. Not only this, the fingers themselves are in effect guards and prevent the overflowing or so-called "drop-off" action of rubbish and straw as is obvious. By regulating the curvature of the fingers in relation to the arc through which the slats swing, it is evident that the fingers themselves ride into contact with the adjacent pivoted ends of the companion slats so as to expedite or facilitate the pushing of the grain over the screen or sieve as a unit. Any roll-back of the stem when the slats are elevated is prevented by the raised fingers which then function as check elements. Thus, the provision of the fingers and V-shaped slots is two-fold; namely, to function as guards and as variable openings.

Incidentally, at the lead-in end of the frame structure I provide adapter plates 21 having risers 22 and depending guard flanges 23.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a thresher screen expressly designed for handling soy beans, a relatively stationary frame, a pair of horizontally disposed spaced parallel rocker shafts mounted for oscillation in said frame, a pair of duplicate longitudinally elongated flat plates constituting screen slats and fixedly secured along corresponding longitudinal edges to said rocker shaft, the free swingable longitudinal edges of said slats being provided with longitudinally spaced notches to permit passage of air and grain therethrough when the slats are in the same horizontal plane and completely closed, said free swingable longitudinal edges of said plates being provided with depending spaced guard fingers alternately arranged with respect to said notches, said guard fingers being longitudinally curved and the curvature corresponding to the curvature of the arc through which the fingers are swingable during the opening and closing movements of said plates, the ends of the fingers adjacent said plates being joined directly to the contiguous longitudinal edge of said plates and the points of connection being flush with the upper faces of said plates, and said notches registering with the spaces between said fingers.

SOREN F. D. PETERSEN.